(12) United States Patent
Mohri et al.

(10) Patent No.: US 7,393,607 B2
(45) Date of Patent: Jul. 1, 2008

(54) FUEL CELL AND FUEL CELL STACK

(75) Inventors: Masahiro Mohri, Utsunomiya (JP);
Yosuke Fujii, Kawachi-gun (JP);
Hiromichi Yoshida, Shioya-gun (JP);
Daisuke Wachi, Shioya-gun (JP);
Shuhei Goto, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 541 days.

(21) Appl. No.: 10/454,215

(22) Filed: Jun. 4, 2003

(65) Prior Publication Data

US 2004/0038112 A1 Feb. 26, 2004

(30) Foreign Application Priority Data

Jun. 11, 2002 (JP) ............................. 2002-169934

(51) Int. Cl.
*H01M 8/02* (2006.01)
(52) U.S. Cl. .............................. 429/36; 429/34; 429/35; 429/38
(58) Field of Classification Search .................... 429/34
See application file for complete search history.

(56) References Cited

U.S. PATENT DOCUMENTS 6,071,635 A * 6/2000 Carlstrom, Jr. ............... 429/34
6,099,984 A    8/2000 Rock
6,348,280 B1 * 2/2002 Maeda et al. ................ 429/38
6,468,682 B1 * 10/2002 Fuglevand et al. ........... 429/26
6,689,504 B1 * 2/2004 Matsumoto et al. .......... 429/39
2002/0045084 A1 * 4/2002 Fujii et al. .................... 429/30

FOREIGN PATENT DOCUMENTS

| JP | 63-13309 | 3/1988 |
| JP | 3-119665 | 5/1991 |
| JP | 2001-110432 | 4/2001 |

OTHER PUBLICATIONS

Japanese Office Action for Application No. 2002-169934, dated Jul. 18, 2006.

* cited by examiner

*Primary Examiner*—Raymond Alejandro
*Assistant Examiner*—Cynthia Lee
(74) *Attorney, Agent, or Firm*—Lahive & Cockfield, LLP; Anthony A. Laurentano, Esq.

(57) ABSTRACT

A fuel cell includes a membrane electrode assembly, and a first and second separators for sandwiching the membrane electrode assembly. The first separator has an oxygen-containing gas flow passage for allowing an oxygen-containing gas in a serpentine pattern to flow horizontally back and forth, and flow downwardly. Partition areas are provided along the oxygen-containing gas flow passage in the serpentine pattern. The partition areas are formed by partially cutting out a gas diffusion layer. Insulating seals for preventing leakage of the oxygen-containing gas are provided in the partition areas.

6 Claims, 8 Drawing Sheets

FUEL CELL AND FUEL CELL STACK

BACKGROUND OF THE INVENTION

1. Field of the Invention

The present invention relates to a fuel cell including an electrolyte electrode assembly and a pair of separators for sandwiching the electrolyte electrode assembly. Each of the electrolyte electrode assemblies includes a pair of electrodes and an electrolyte interposed between the electrodes. The separator has a serpentine reactant gas flow passage on its surface facing the electrolyte electrode assembly. Further, the present invention relates to a fuel cell stack formed by stacking a plurality of the fuel cells.

2. Description of the Related Art

For example, a solid polymer electrolyte fuel cell employs a membrane electrode assembly (MEA) which comprises two electrodes (anode and cathode) and an electrolyte membrane interposed between the electrodes. The electrolyte membrane is a polymer ion exchange membrane (proton exchange membrane). Each of the electrodes comprises a catalyst and a porous carbon paper. The membrane electrode assembly is interposed between separators. The membrane electrode assembly and the separators make up a unit of the fuel cell for generating electricity. A predetermined number of fuel cells are stacked together to form a fuel cell stack.

In the fuel cell, a fuel gas such as a hydrogen-containing gas is supplied to the anode. The catalyst of the anode induces a chemical reaction of the fuel gas to split the hydrogen molecule into hydrogen ions (protons) and electrons. The hydrogen ions move toward the cathode through the electrolyte, and the electrons flow through an external circuit to the cathode, creating a DC electric current. An oxygen-containing gas or air is supplied to the cathode. At the cathode, the hydrogen ions from the anode combine with the electrons and oxygen to produce water.

In the fuel cell, the fuel gas and the oxygen-containing gas need to be supplied to the entire power generation surfaces of the anode and the cathode between the separators for maintaining the desired power generation performance. Therefore, for example, long reactant gas flow passages (fuel gas flow passage and oxygen-containing gas flow passage) in serpentine patterns are provided on the separators.

In the serpentine reactant gas flow passages, relatively large pressure losses occur for supplying the reactant gases uniformly. Since the reactant gases tend to flow into portions at relatively low pressure, the reactant gases may short-circuit (shortcut) or bypass the intended routes in the serpentine reactant gas flow passages, and the reactant gases may not be supplied to the power generation surfaces sufficiently for the fuel cell reaction.

In an attempt to address the problem, a fuel cell disclosed in the U.S. Pat. No. 6,099,984 has serpentine flow channels in a mirror-image fashion as a passage of the reactant gas. Each of the flow channels is the mirror image of the next adjacent flow channel. Therefore, no pressure difference exists between the adjacent flow channels, and the short-circuit of the reactant gas is prevented.

Figure 8:
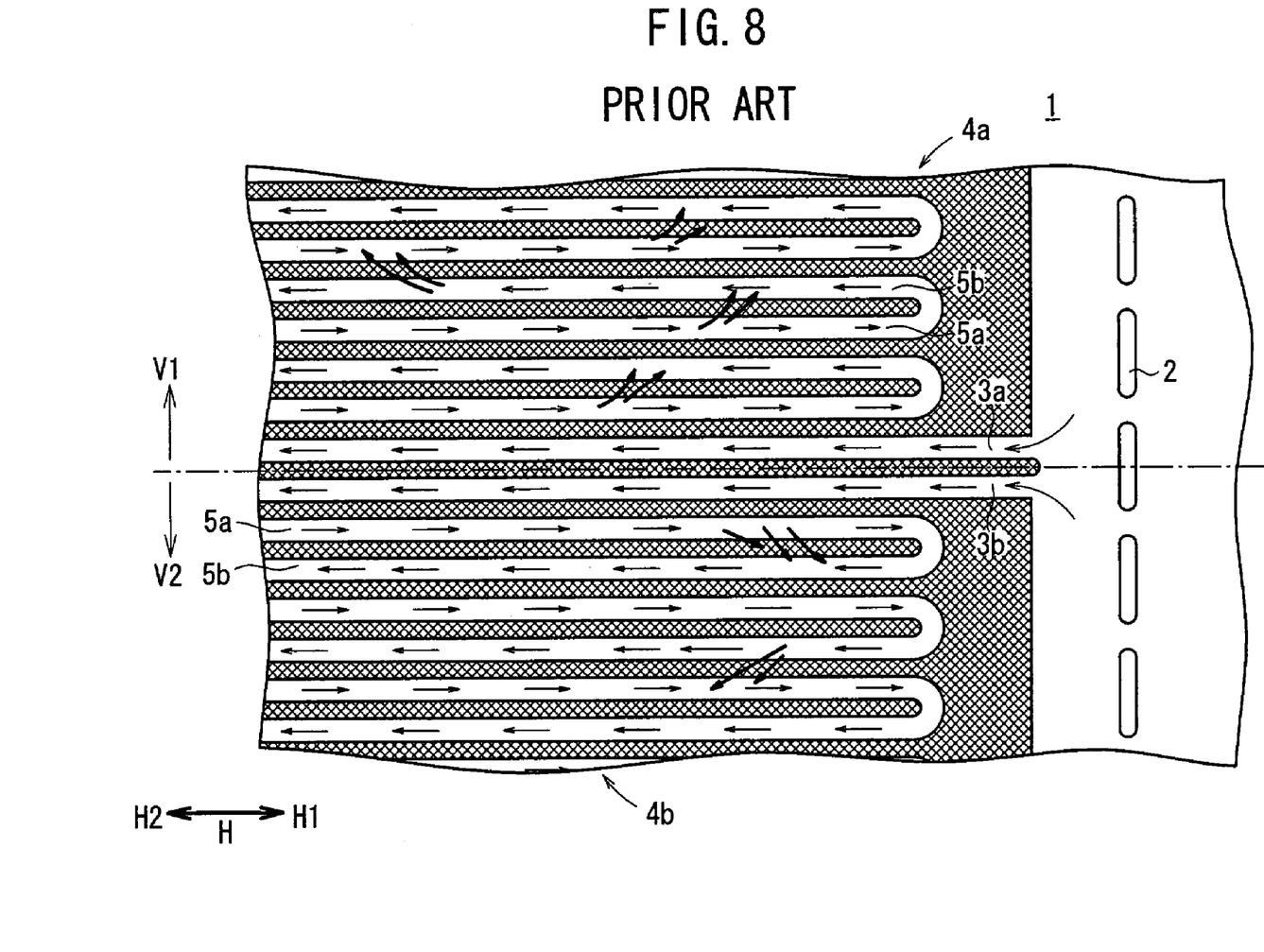
FIG. 8 is an enlarged view showing a part of a conventional separator.

Specifically, as shown in FIG. 8, a plurality of supply manifolds 2 are formed at an end of a separator 1. The supply manifolds 2 are connected to pairs of first-and second serpentine flow channels 4a, 4b through inlet legs 3a, 3b, respectively. In FIG. 8, one pair of the first and second serpentine flow channels 4a, 4b are shown. The first and second serpentine flow channels 4a, 4b are connected to exhaust manifolds through outlet legs (not shown).

The first serpentine flow channel 4a is symmetrical with the second serpentine flow channel 4b. The first serpentine flow channel 4a allows the reactant gas to flow back and forth in a direction indicated by an arrow H, and flow in a direction indicated by an arrow V1. The second serpentine flow channel 4b allows the reactant gas to flow back and forth in the direction H, and flow in a direction indicated by an arrow V2 which is opposite to the direction V1. Therefore, the reactant gas is supplied to the inlet legs 3a, 3b at substantially the same pressure, and the short-circuit of the reactant gas is prevented.

In the first and second serpentine flow channels 4a, 4b, for example, after the reactant gas flows along a flow groove 5a in the direction H1, and the reactant gas turns back to flow along a flow groove 5b in the opposite direction H2. A pressure difference may exist between the flow groove 5a and the flow groove 5b. Therefore, the reactant gas may short-circuit the flow channel from the flow groove 5a to the flow groove 5b. Stated otherwise, the reactant gas may flow through a gas diffusion layer of the anode or the cathode undesirably. In particular, when the operating pressure is high, or the amount of the reactant gas supplied to the fuel cell is large, the shortcut of the reactant gas frequently happens.

Therefore, in the fuel cell, the reactant gases are not supplied to the entire power generation surfaces uniformly, and the power generation performance is lowered. The mirror image structure of the flow channels is complicated, and the production cost of the separator 1 is high.

SUMMARY OF THE INVENTION

A main object of the present invention is to provide a fuel cell having a simple and inexpensive structure in which leakage of the reactant gas is effectively prevented, and the desired power generation performance of the fuel cell is maintained. Further, the present invention is directed to provide a fuel cell stack formed by stacking a plurality the fuel cells.

According to the present invention, at least one serpentine reactant gas passage is formed on at least one surface of the separators facing the electrolyte electrode assembly for supplying a reactant gas in a serpentine pattern to the electrolyte electrode assembly. The reactant gas including at least one of an oxygen-containing gas and a fuel gas. At least one partition area is provided for dividing opposite flows of the reactant gas in the reactant gas passage, and a member for preventing leakage of said reactant gas is provided in the partition area.

Therefore, at the partition area in which a pressure difference of the reactant gas may exist, shortcuts of the reactant gas through the partition area are effectively prevented. With the simple and inexpensive structure, leakage of the reactant gas is reliably prevented, and the reactant gas is uniformly supplied to the power generation surfaces of the fuel cell. Thus, the desired power generation performance of the fuel cell is reliably maintained.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
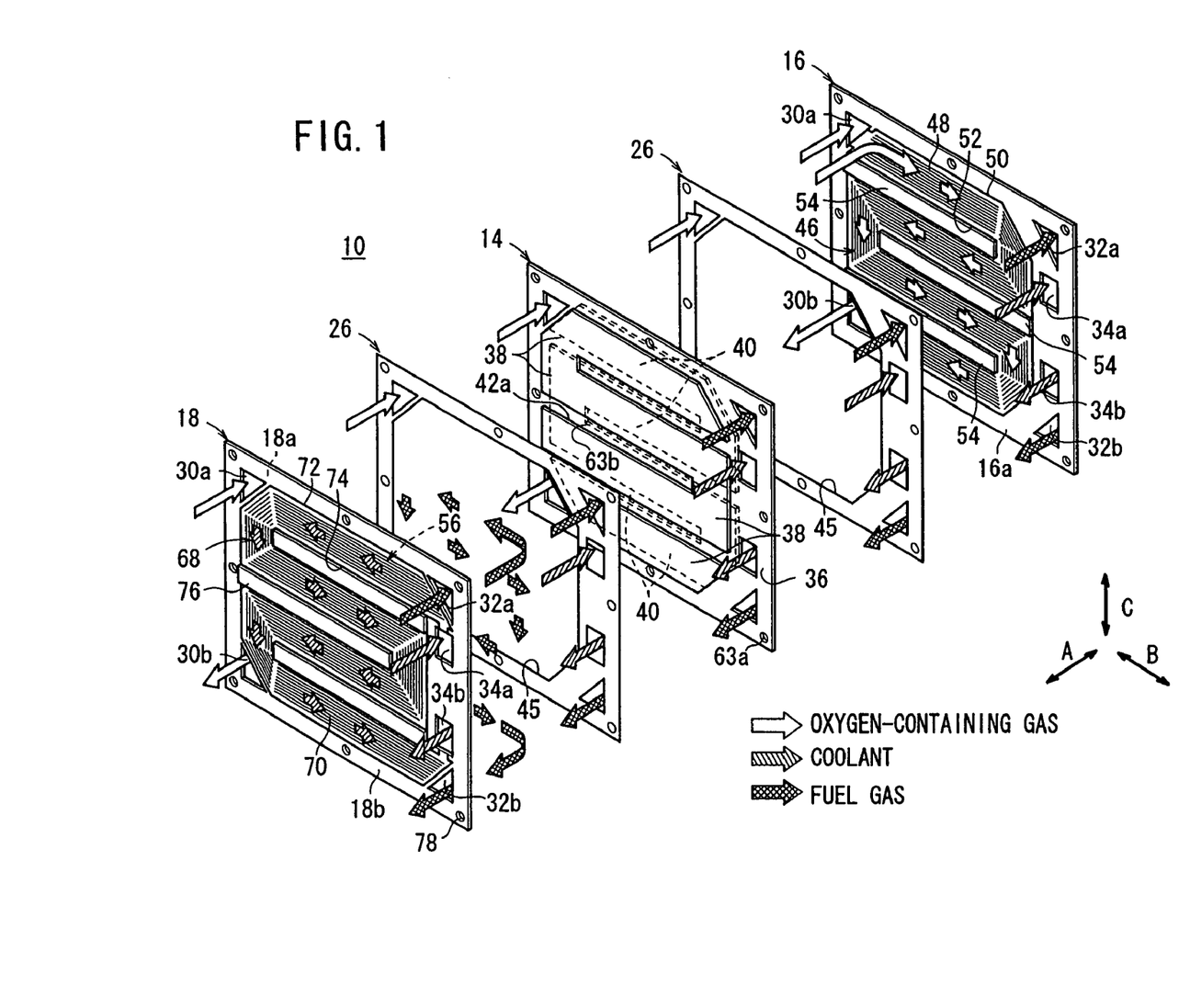
FIG. 1 is an exploded perspective view showing main components of a fuel cell according to a first embodiment of the present invention.
Figure 2:
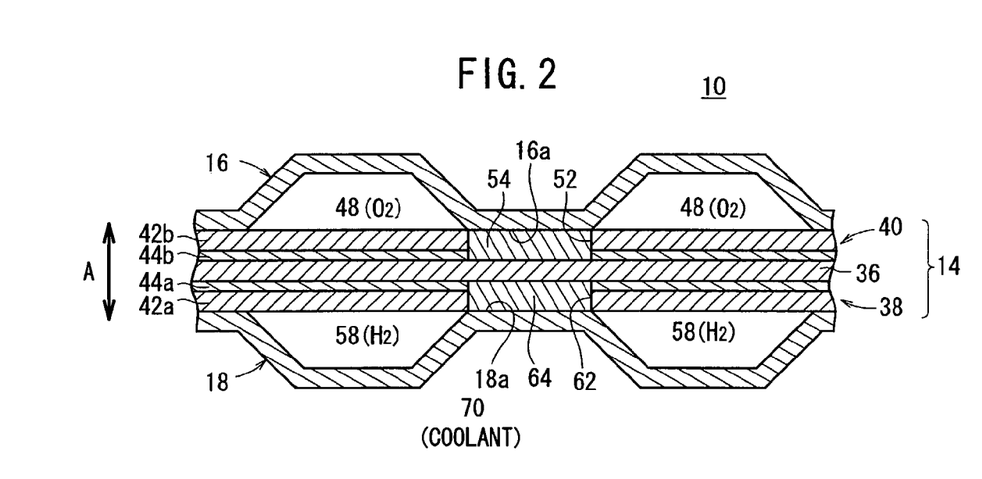
FIG. 2 is a cross sectional view showing a part of the fuel cell stack.

FIG. 1 is an exploded perspective view showing main components of a fuel cell 10 according to a first embodiment of the present invention, and FIG. 2 is a cross sectional view showing a part of the fuel cell 10.

The fuel cell 10 includes a membrane electrode assembly (electrolyte electrode assembly) 14, and a first and second separators 16, 18 for sandwiching the membrane electrode assembly 14. Each of the separators 16, 18 is formed of a metal plate, for example. Seal members 26 such as gaskets are inserted between the membrane electrode assembly 14 and the first separator 16, and the membrane electrode assembly 14 and the separator 17, respectively, for sealing gas passages as described later on, and sealing electrode surfaces (power generation surfaces).

At one horizontal end of the fuel cell 10 in a direction indicated by an arrow B, an oxygen-containing gas supply passage 30a for supplying an oxygen-containing gas, an oxygen-containing gas discharge passage 30b for discharging the oxygen-containing gas are arranged in a vertical direction indicated by an arrow C. The oxygen-containing gas supply passage 30a and the oxygen-containing gas discharge passage 30b extend in a stacking direction indicated by an arrow A.

At the other horizontal end of the fuel cell 10 in the direction indicated by the arrow B, a fuel gas supply passage 32a for supplying a fuel gas such as a hydrogen-containing gas, a coolant supply passage 34a for supplying a coolant, a coolant discharge passage 34b for discharging the coolant, and a fuel gas discharge passage 32b for discharging the fuel gas are arranged in the direction indicated by the arrow C.

The membrane electrode assembly 14 comprises an anode 38, a cathode 40, and an ion exchange membrane 36 of a solid polymer electrolyte interposed between the anode 38 and the cathode 40. The ion exchange membrane 36 is formed by impregnating a thin membrane of perfluorosulfonic acid with water, for example.

As shown in FIG. 2, each of the anode 38 and the cathode 40 has a gas diffusion layer 42a, 42b such as a carbon paper, and an electrode catalyst layer 44a, 44b of platinum alloy supported on carbon particles. The carbon particles of the electrode catalyst layer 44a, 44b are deposited uniformly on the surface of the gas diffusion layer 42a, 42b. The electrode catalyst layer 44a of the anode 38 and the electrode catalyst layer 44b of the cathode 40 are fixed to both surfaces of the ion exchange membrane 36, respectively. The shapes of the anode 38 and the cathode correspond to an oxygen-containing gas flow passage and a fuel gas flow passage as described later (see FIG. 1).

Each of the seal members 26 has an opening 45 corresponding to the anode 38 or the cathode 40. Alternatively, seals are formed on the first separator 16 and the second separator 18 by heat instead of using the seal members 26.

Figure 3:
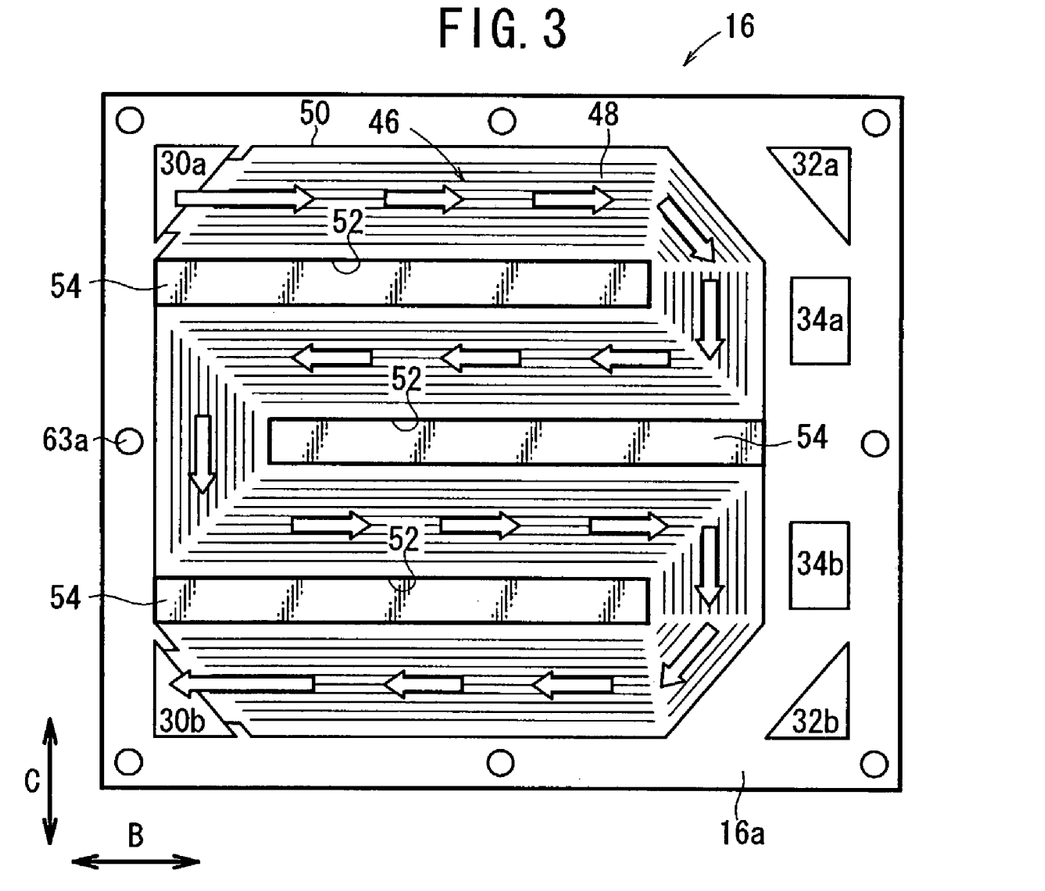
FIG. 3 is a front view showing a first separator of the fuel cell.

As shown in FIGS. 1 and 3, the first separator 16 has the oxygen-containing gas flow passage (serpentine reactant gas flow passage) 46 on its surface 16a facing the membrane electrode assembly 14. The oxygen-containing gas flow passage 46 is connected to the oxygen-containing gas supply passage 30a at one end, and connected to the oxygen-containing gas discharge passage 30b at the other end. The oxygen-containing gas flow passage 46 comprises a plurality of grooves 48 extending in a serpentine pattern for allowing the oxygen-containing gas to flow horizontally back and forth, and flow vertically (downwardly) along a wall 50 on the surface 16a of the first separator 16.

Partition areas 52 are provided along the oxygen-containing gas flow passage 46 in the serpentine pattern. The partition areas 52 divide opposite flows of the oxygen-containing gas in the oxygen-containing gas flow passage 46. In the present embodiment, three partition areas 52 are arranged at intervals in the direction indicated by the arrow C. Insulating seals 54 are provided in the partition areas 52 for preventing leakage of the oxygen-containing gas through the partition areas 52. With the seals 54, shortcuts or backflows of the oxygen-containing gas in the oxygen-containing gas flow passage 46 having horizontally opposite flows of the oxygen-containing gas are prevented.

The seals 54 are fixed to the first separator 16 by heat, for example. When the first separator 16 is stacked on the membrane electrode assembly 14, the shape of the seals 54 conforms to the shape of the cathode 40. The gas diffusion layer 42b has partial cutouts for providing the seals 54 (see FIG. 2). In FIG. 2, both of the gas diffusion layer 42b and the catalyst layer 44b are cut out. However, the catalyst layer 44b may not be cut out for providing the seals 54. The seal 54 is formed of an electrically insulating material such as EPDM (Ethylene Propylene Diene Monomer) or silicone rubber.

The seals 54 may be attached to the membrane electrode assembly 14 instead of the first separator 16. The member for preventing leakage of the oxygen-containing gas may be formed by impregnating the gas diffusion layer 42b with a sealing material without cutting out the gas diffusion layer 42b.

Figure 4:
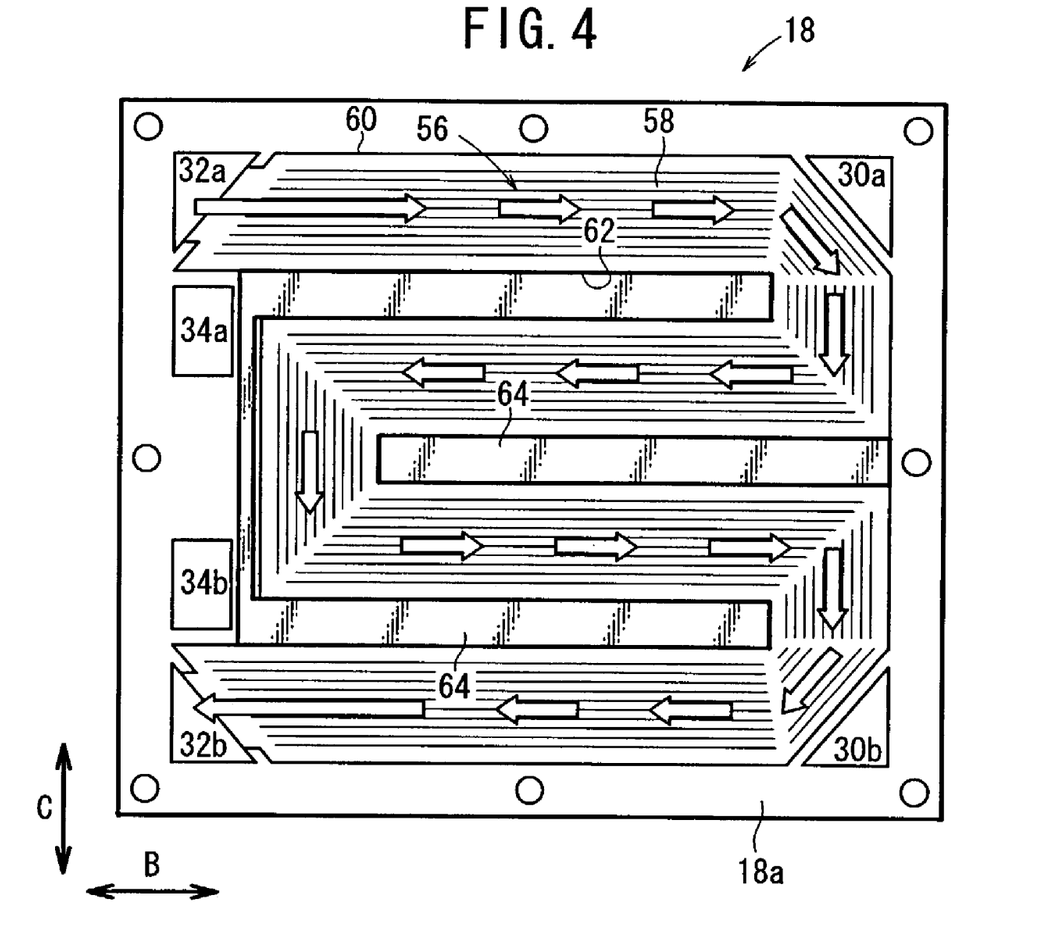
FIG. 4 is a front view showing a second separator of the fuel cell.

As shown in FIG. 4, the second separator 18 has the fuel gas flow passage (serpentine reactant gas flow passage) 56 on its surface 18a facing the membrane electrode assembly 14. The fuel gas flow passage 56 is connected to the fuel gas supply passage 32a at one end, and connected to the fuel gas discharge passage 32b at the other end. The fuel gas flow passage 56 comprises a plurality of grooves 58 extending in a serpentine pattern for allowing the fuel gas to flow horizontally back and forth, and flow vertically (downwardly) along a wall 60 on the surface 18a of the second separator 18.

Partition areas 62 are provided along the fuel gas flow passage 56 in the serpentine pattern. The partition areas 62 divide opposite flows of the fuel gas in the fuel gas flow passage 56. In the present embodiment, three partition areas 62 are arranged at intervals in the direction indicated by the arrow C. The upper partition area 62 is connected to the lower partition area 62 on the left side conforming to the shape of the fuel gas flow passage 56. Insulating seals 64 are provided in the partition areas 62 for preventing leakage of the fuel gas through the partition areas 62. With the seals 64, shortcuts or backflows of the fuel gas in the fuel gas flow passage 56 having horizontally opposite flows of the fuel gas are prevented.

The seals 64 are fixed to the second separator 18 by heat, for example. At least the gas diffusion layer 42a has partial cutouts for providing the seals 64 when the second separator 18 is stacked on the membrane electrode assembly 14 (see FIG. 2).

As shown in FIG. 1, a coolant gas flow passage 68 is formed on a surface 18b of the second separator 18. The coolant flow passage 56 is connected to the coolant supply passage 34a at one end, and connected to the coolant discharge passage 34b at the other end. The coolant flow passage 68 comprises a plurality of grooves 70 extending in a serpentine pattern for allowing the coolant to flow horizontally back and forth, and flow vertically (downwardly) along a wall 72 on the surface 18b of the second separator 18.

Partition areas 74 are provided along the coolant flow passage 68 in the serpentine pattern. The partition areas 74 divide opposite flows of the coolant gas in the coolant flow passage 68. Insulating seals 54 are provided in the partition areas 74 for preventing leakage of the coolant through the partition areas 74. The seals 74 are fixed to the second separator 18 by heat, for example.

The fuel cell 10 has a plurality of, e.g., eight holes 78 around the anode 38 and the cathode 40 for inserting bolts to tighten a fuel cell stack formed by stacking a plurality of the fuel cell 10 in a stacking direction indicated by the arrow A. The holes 78 extend in the stacking direction. The number of the holes 78 is determined by the dimensions of the fuel cell 10, for example.

Next, operation of the fuel cell 10 will be described below. As shown in FIG. 1, in operating the fuel cell 10, a fuel gas such as a hydrogen-containing gas is supplied to the fuel gas supply passage 32a, and an oxygen-containing gas is supplied to the oxygen-containing gas supply passage 30a. Further, a coolant such as pure water, an ethylene glycol or an oil is supplied to the coolant supply passage 34a.

The oxygen-containing gas flows from the oxygen-containing gas supply passage 30a into the oxygen-containing gas flow passage 46 formed on the first separator 16, and flows through the grooves 48 in a serpentine pattern along the cathode 40 of the membrane electrode assembly 14 to induce an electrochemical reaction at the cathode 40 (see FIG. 3). The fuel gas flows from the fuel gas supply passage 32a into the fuel gas flow passage 56 formed on the second separator 18, and flows through the grooves 58 in a serpentine pattern along the anode 38 of the membrane electrode assembly 14 to induce an electrochemical reaction at the anode 38 (see FIG. 4).

In the membrane electrode assembly 14, the oxygen-containing gas supplied to the cathode 40, and the fuel gas supplied to the anode 38 are consumed in the electrochemical reactions at catalyst layers 44a, 44b of the cathode 40 and the anode 38 for generating electricity.

After the fuel gas is consumed at the anode 38, the fuel gas is discharged into the fuel gas discharge passage 32b, and flows in the direction indicated by the arrow A. Similarly, after the oxygen-containing gas is consumed at the cathode 40, the oxygen-containing gas is discharged into the oxygen-containing gas discharge passage 30b, and flows in the direction indicated by the arrow A.

As shown in FIG. 1, the coolant flows from the coolant supply passage 34a into the coolant flow passage 68 formed on the second separator 18, and flows through the grooves 70 in a serpentine pattern to cool the membrane electrode assembly 14. After the coolant is used for cooling the membrane electrode assembly 14, the coolant is discharged into the coolant discharge passage 34b.

In the first embodiment, the oxygen-containing gas flow passage 46 and the fuel gas flow passages 56 are provided in the fuel cell 10. Each of the oxygen-containing gas flow passage 46 and the fuel gas flow passage 56 is formed in a serpentine pattern. The partition areas 52 are provided along the oxygen-containing gas flow passage 46 in the serpentine pattern. The partition areas 52 divide opposite flows of the oxygen-containing gas in the oxygen-containing gas flow passage 46. The partition areas 52 are formed by partially cutting out the gas diffusion layer 42b. The seals 54 are provided in the partition areas 52 for preventing leakage (shortcuts or backflows) of the oxygen-containing gas through the partition areas 52. The partition areas 62 are provided along the fuel gas flow passage 56 in the serpentine pattern. The partition areas 62 divide opposite flows of the fuel gas in the fuel gas flow passage 56. The partition areas 62 are formed by partially cutting out the gas diffusion layer 42a. The seals 64 are provided in the partition areas 62 for preventing leakage (shortcuts or backflows) of the fuel gas through the partition areas 62.

For example, as shown in FIG. 3, the oxygen-containing gas flow passage 46 has opposite flows of the oxygen-containing gas in the grooves 48 around the partition areas 52. Even if a pressure difference exists between the flows of the oxygen-containing gas, shortcuts of the oxygen-containing gas due to leakage through the seals 54 in the partition areas 52 (gas diffusion layer 42b) do not occur. Further, as shown in FIG. 4, the fuel gas flow passage 56 has opposite flow of the fuel gas in the grooves 58 around the partition areas 62. Even if a pressure difference exists between the flows of the fuel gas, shortcuts of the fuel gas due to leakage through the seals 64 in the partition areas 62 (gas diffusion layer 42a) do not occur.

In the first embodiment, the seals 54, 64 are provided in the partition areas 52, 62 formed simply by partially cutting out the gas diffusion layers 42b, 42b, respectively. With the simple and inexpensive structure, leakage of the reactant gases (oxygen-containing gas and fuel gas) is reliably prevented. Therefore, the reactant gases are supplied uniformly and reliably to the entire power generation surfaces of the anode 38 and the cathode 40. Thus, the desired power generation performance of the fuel cell is maintained.

Further, in the coolant flow passage 68, the seals 76 are provided in the partition areas 74 (see FIG. 1). Therefore, shortcuts of the coolant do not occur in the coolant flow passage 68. The entire power generation surfaces of the anode 38 and the cathode 40 can be cooled suitably and reliably.

Figure 5:
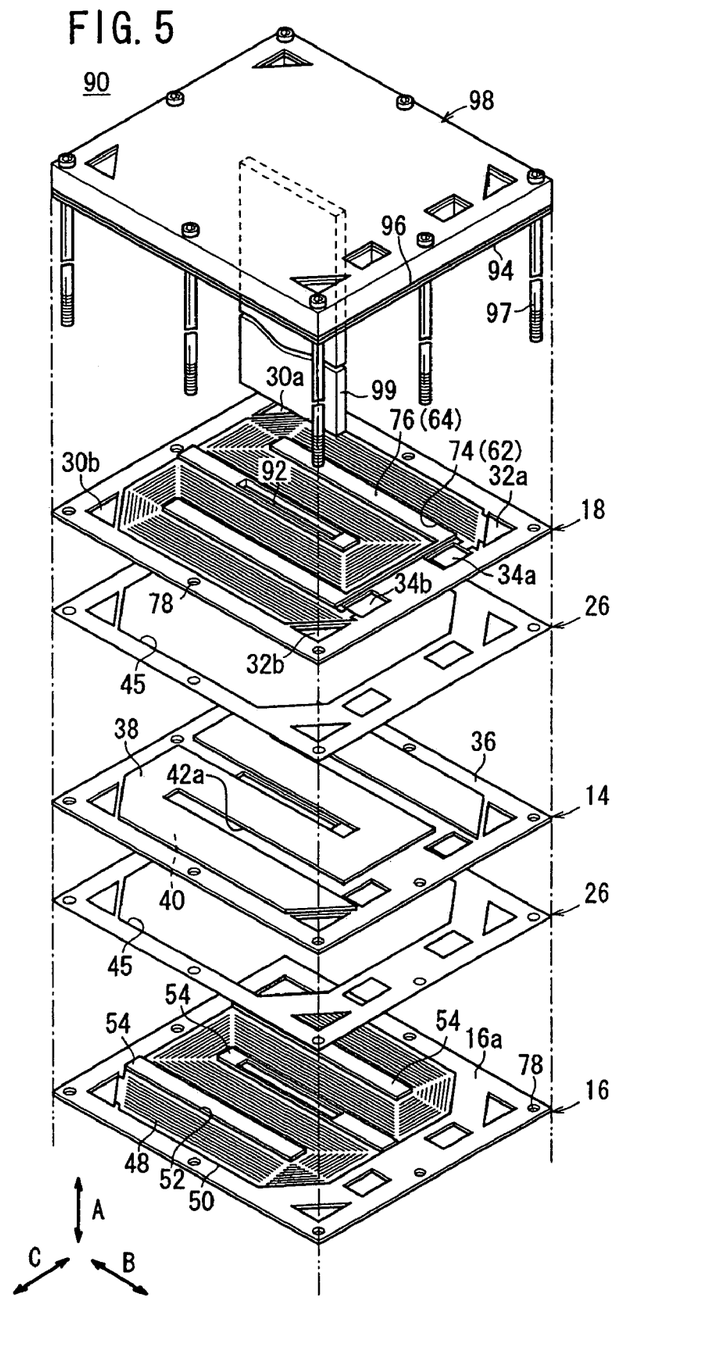
FIG. 5 is an exploded perspective view showing main components of a fuel cell according to a second embodiment of the present invention.

FIG. 5 is an exploded perspective view showing main components of a fuel cell 90 according to a second embodiment of the present invention. The constituent elements that are identical to those of the fuel cell 10 of the first embodiment are labeled with the same reference numeral, and description thereof is omitted.

The fuel cell 90 may have one, two, or three openings 92 in partition areas 52, 62, 74. In the second embodiment, one opening 92 is formed in one of the partition areas 52, one of the partition areas 62, and one of the partition areas 74, respectively, at a central region of the fuel cell 90. The opening 92 has a rectangular shape, and extends in the stacking direction of the fuel cell 90 indicated by an arrow A.

The fuel cell 90 shown in FIG. 5 is an outermost fuel cell provided at one end of a fuel cell stack (not shown) formed by stacking a predetermined number of fuel cells 90 in the stacking direction indicated by the arrow A.

A terminal plate 94, an insulating plate 96, and an end plate 98 are provided outside the fuel cell 90. The terminal plate 94, the insulating plate 96, and the end plate 98 are also provided outside the other outermost fuel cell 90 at the other end of the fuel cell stack.

The end plate 98 has a rectangular positioning guide 99 at a portion corresponding to the opening 92 of the fuel cells 90. The positioning guide 99 is inserted in the opening 92 in the stacking direction for positioning the fuel cells 90 in alignment with the end plate 98, the insulating plate 96, and the terminal plate 94.

Tightening bolts 97 are inserted into holes 78 formed adjacent the outer edge of the fuel cells 90. The tightening bolts 97 are inserted through the other end plate and screwed into nuts (not shown) for tightening the fuel cells 90 together.

In the second embodiment, the fuel cell 90 has the opening 92 extending in the stacking direction. The positioning guide 99 of the end plate 98 is inserted into the opening 92. Therefore, the fuel cell 90 is positioned easily and accurately, and tightened by the end plate 98. Thus, the assembling operation of the fuel cell stack is efficiently performed. The seals 54, 64, and 76 are insulating seals for preventing electrical connection between the first separator 16 and the second separator 18 through the positioning guide 99.

The fuel cell 90 is tightly stacked by inserting the positioning guide 99 in the opening 92. Thus, in particular, when the fuel cell 90 is mounted on a vehicle, the undesirable displacement due to vibrations or the like is reduced, and leakage of the fuel gas, the oxygen-containing gas, and the coolant is effectively prevented.

Figure 6:
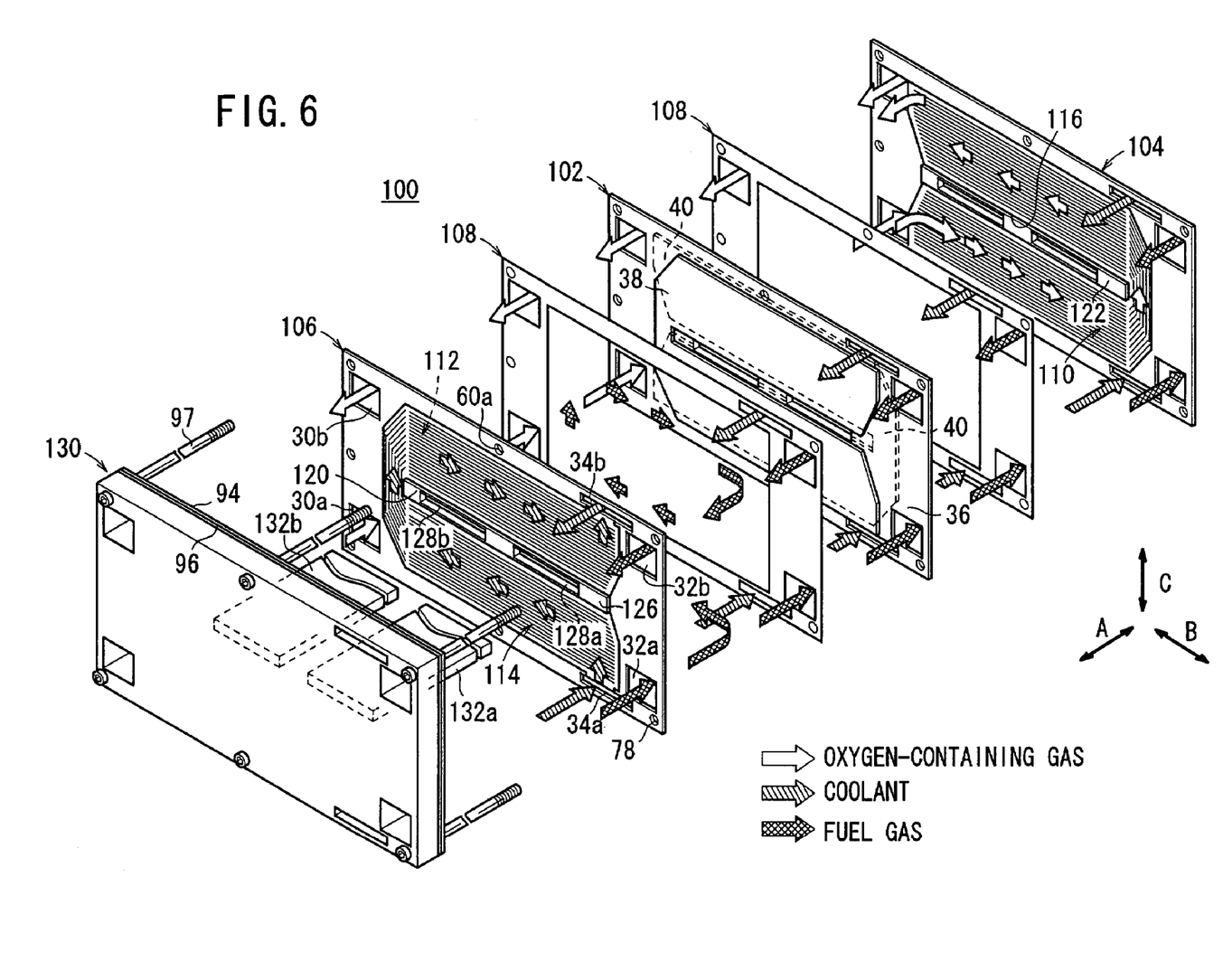
FIG. 6 is an exploded perspective view showing main components of a fuel cell according to a third embodiment of the present invention.

FIG. 6 is a view showing main components of the fuel cell 100 according to a third embodiment of the present invention.

The fuel cell 100 includes a membrane electrode assembly 102, first and second separators 104, 106, a seal member 108 interposed between the membrane electrode assembly 102 and the first separator 104, and a seal member 108 interposed between the membrane electrode assembly 102 and the second separator 106.

At one horizontal end of the fuel cell 100 in a direction indicated by an arrow B, an oxygen-containing gas supply passage 30a for supplying an oxygen-containing gas is formed on a lower side, and an oxygen-containing gas discharge passage 30b for discharging the oxygen-containing gas is formed on an upper side.

At the other horizontal end of the fuel cell 100 in the direction indicated by the arrow B, a fuel gas supply passage 32a is formed on a lower side, and a fuel gas discharge passage 32b is formed on an upper side. Further, a coolant supply passage 34a is formed at a lower position near the fuel gas supply passage 32a, and a coolant discharge passage 34b is positioned at an upper position near the fuel gas discharge passage 32b.

Figure 7:
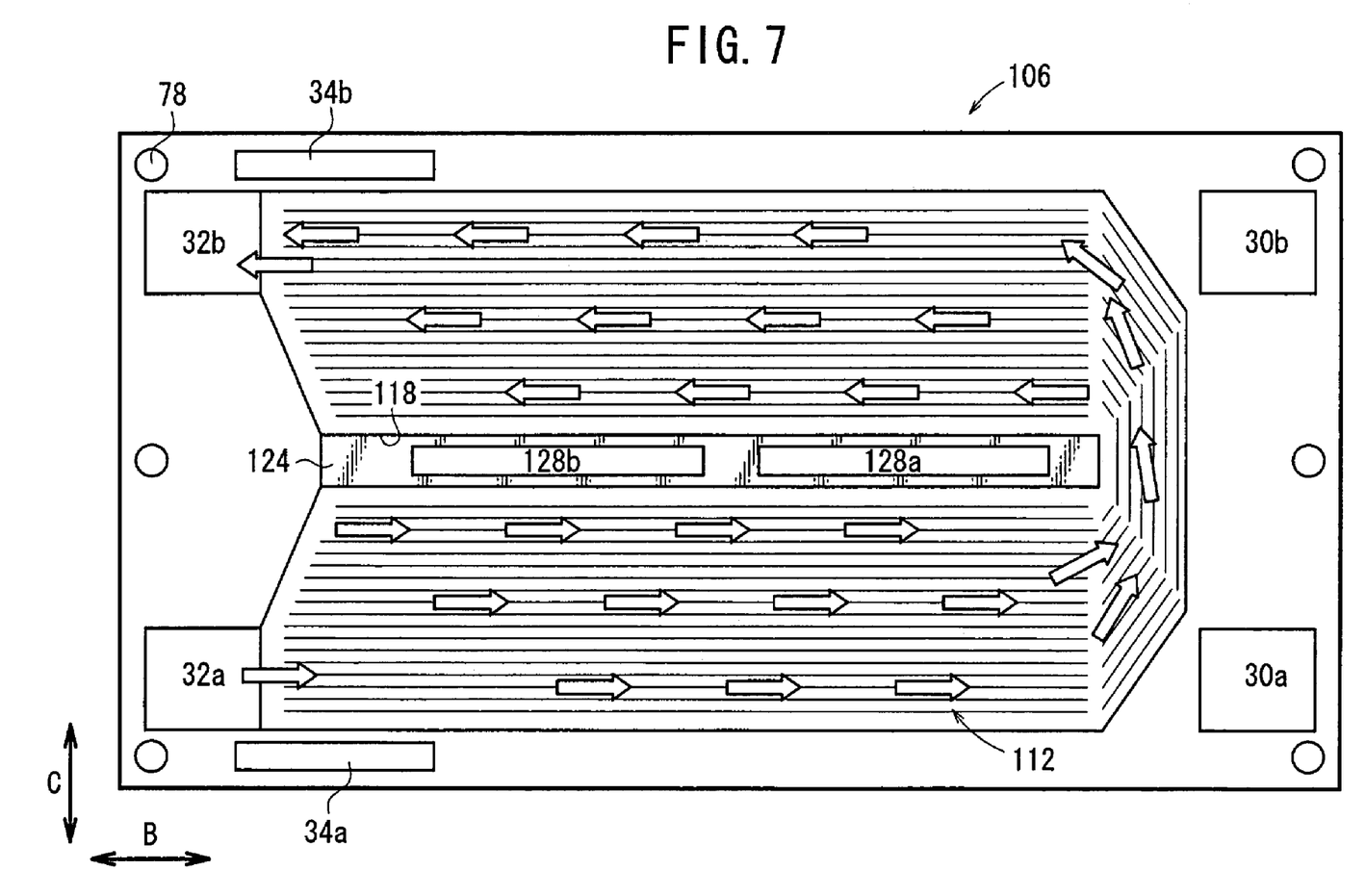
FIG. 7 is a front view showing a second separator of the fuel cell according to the third embodiment of the present invention.

The first separator 104 has an oxygen-containing gas flow passage (serpentine reactant gas flow passage) 110. Further, as shown in FIG. 7, the second separator 106 has a fuel gas flow passage (serpentine reactant gas flow passage) 112. As shown in FIG. 6, the second separator 106 has a coolant flow passage 114 on its surface opposite to the fuel gas flow passage 112.

Each of the oxygen-containing gas flow passage 110, the fuel gas flow passage 112, and the coolant flow passage 114 extends in a serpentine pattern including a single turning point. Partition areas 116, 118, 120 are provided along the oxygen-containing gas flow passage 110, the fuel gas flow passage 112, and the coolant flow passage 114, respectively. Seals 122, 124, 126 for preventing leakage (shortcuts) of the oxygen-containing gas, the fuel gas, and the coolant are provided in the partition areas 116, 118, 120, respectively.

A predetermined number of, e.g., two openings 128a, 128b are formed in the stacking direction at a substantially central region of the fuel cell 100. An end plate 130 is provided outside the outermost fuel cell 100 at one end in the stacking direction of the fuel cell stack. The end plate 130 has positioning guides 132a, 132b. The positioning guides 132a, 132b are inserted into the openings 128a, 128b, respectively.

In the third embodiment, the oxygen-containing gas supplied to the oxygen-containing gas flow passage 110 of the first separator 104 does not leak through the partition area 116, since the seal 122 is provided in the partition area 116. Thus, no shortcuts occur in the oxygen-containing gas flow passage. With the simple and inexpensive structure, as with the first embodiment, leakage of the reactant gases are reliably prevented, and the desired power generation performance of the fuel cell 100 is maintained.

In assembling a plurality of the fuel cells 100 to form the fuel cell stack, the positioning guides 132a, 132b of the end plate 130 are inserted into the openings 128a, 128b of the fuel cells 100, respectively. With the positioning guides 132a, 132b, the fuel cell 100 is tightly stacked without any undesirable displacement. As with the second embodiment, the fuel cell 100 is suitably used in the vehicles.

In the fuel cell stack according to the present invention, partition area is formed by partially cutting out gas diffusion layers to provide seals in the partition areas. Pressure differences may exist around the partition areas. However, the seals in the partition areas prevent shortcuts of the reactant gases due to leakage through the partition areas, i.e., the gas diffusion layers. With the simple and inexpensive structure, leakage of the reactant gases is reliably prevented, and the reactant gases are uniformly supplied to the entire power generation surfaces. Thus, the desired power generation performance of the fuel cell is maintained.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell comprising an electrolyte electrode assembly, and a pair of separators for sandwiching said electrolyte electrode assembly, said electrolyte electrode assembly including an anode, a cathode, and an electrolyte interposed between said anode and said cathode, wherein at least one serpentine reactant gas flow passage is formed on at least one surface of said separators facing said electrolyte electrode assembly for supplying a reactant gas in a serpentine pattern to said electrolyte electrode assembly, said reactant gas including at least one of an oxygen-containing gas and a fuel gas;

a plurality of partition areas are provided along said reactant gas flow passage, each partition area dividing said reactant gas flow passage into an upstream side and a downstream side, said reactant gas flowing along one side of the partition area in one direction in said upstream side of said reactant gas flow passage and along the other side of the partition area in an opposite direction in said downstream side of said reactant gas flow passage;

a plurality of members are provided in said partition areas, each member preventing leakage of said reactant gas between said upstream side and downstream side of said at least one serpentine reactant gas flow passage across said partition area; and areas in direct contact with the partition area are free of gas diffusion layer of at least one of said cathode and said anode.

2. A fuel cell according to claim 1, wherein said reactant gas flow passage extends in the serpentine pattern for allowing said reactant gas to flow horizontally back and forth, and flow downwardly.

3. A fuel cell according to claim 1, wherein an opening for inserting a positioning guide is formed on one of said partition areas to pass through said member provided in said partition area.

4. A fuel cell stack formed by stacking a plurality of fuel cells in a stacking direction, said fuel cells each comprising an electrolyte electrode assembly, and a pair of separators for sandwiching said electrolyte electrode assembly, said electrolyte electrode assembly including an anode, a cathode, and an electrolyte interposed between said anode and said cathode, wherein at least one serpentine reactant gas flow passage is formed on at least one surface of said separators facing said electrolyte electrode assembly for supplying a reactant gas in a serpentine pattern to said electrolyte electrode assembly, said reactant gas including at least one of an oxygen-containing gas and a fuel gas;

a plurality of partition areas are provided along said reactant gas flow passage, each partition area dividing said reactant gas flow passage into an upstream side and a downstream side, said reactant gas flowing along one side of the partition area in one direction in said upstream side of said reactant gas flow passage and along the other side of the partition area in an opposite direction in said downstream side of said reactant gas flow passage;

a plurality of members are provided in said partition areas, each member preventing leakage of said reactant gas between said upstream side and downstream side of said at least one serpentine reactant gas flow passage across said partition area;

areas in direct contact with the partition area are free of gas diffusion layer of at least one of said cathode and said anode;

an opening is formed in said at least one partition area; and a positioning guide is inserted in said opening for positioning said fuel cells.

5. A fuel cell stack according to claim 4, wherein an end plate having said positioning guide is provided outside an outermost fuel cell of said fuel cells stacked together in said stacking direction.

6. A fuel cell comprising:

an electrolyte electrode assembly including an anode, a cathode, and an electrolyte interposed between said anode and said cathode, a pair of separators for sandwiching said electrolyte electrode assembly, a serpentine reactant gas flow passage disposed between said electrolyte electrode assembly and one of said separators for supplying a reactant gas to said electrolyte electrode assembly in a serpentine pattern, wherein said serpentine reactant gas flow passage includes a plurality of turns, each turn dividing the said serpentine reactant gas flow passage into a first reactant gas flow passage and a second reactant gas flow passage;

areas in direct contact with the partition area are free of gas diffusion layer of at least one of said cathode and said anode; and a plurality of members provided adjacent to said plurality of turns, each member being provided between the first gas flow passage and the second gas flow passage so that the reactant gas flows along one side of the member in one direction in the first gas flow passage of said reactant gas flow passage and along the other side of the member in an opposite direction in the second gas flow passage of said reactant gas flow passage, each member sealing the first gas flow passage and the second gas flow passages and preventing said reactant gas from flowing from the first gas flow passage to the second gas flow passage.

* * * * *